United States Patent [19]

Shibata et al.

[11] Patent Number: 5,099,373
[45] Date of Patent: Mar. 24, 1992

[54] HEAD ACTUATOR HAVING A PLURALITY OF HEAD ARMS AND LOAD SPRINGS FOR DISC DRIVE AND STORAGE SYSTEM, AND RELATED METHOD ASSEMBLY

[75] Inventors: Kouji Shibata, Kawasaki; Kojiro Mito, Yokohama; Kazuo Sakurai; Kohtoku Shishido, both of Nagano, all of Japan

[73] Assignee: Fujitsu Limited, Kawasaki, Japan

[21] Appl. No.: 486,423

[22] Filed: Feb. 28, 1990

[30] Foreign Application Priority Data

Mar. 8, 1989 [JP] Japan ................................. 1-55417

[51] Int. Cl.$^5$ ............................... G11B 5/48
[52] U.S. Cl. ........................ 360/104; 360/106
[58] Field of Search ................ 360/104–106, 360/109

[56] References Cited

U.S. PATENT DOCUMENTS

| | | | |
|---|---|---|---|
| 4,796,122 | 1/1989 | Levy et al. | 360/98.01 |
| 4,829,395 | 5/1989 | Coon et al. | 360/104 |
| 4,860,135 | 8/1989 | Cain | 360/106 |
| 4,888,656 | 12/1989 | West | 360/106 |
| 4,942,491 | 7/1990 | Osawa et al. | 360/104 |
| 4,947,275 | 8/1990 | Hinlein | 360/104 |
| 4,949,194 | 8/1990 | MacPherson et al. | 360/104 |

FOREIGN PATENT DOCUMENTS

| | | | |
|---|---|---|---|
| 60-57584 | 4/1985 | Japan | 360/104 |
| 63-188878 | 8/1988 | Japan | . |
| 2-40175 | 2/1990 | Japan | 360/104 |

Primary Examiner—Aristotelis Psitos
Assistant Examiner—Jefferson Evans
Attorney, Agent, or Firm—Staas & Halsey

[57] ABSTRACT

A head actuator for a disc drive and storage system having a plurality of discs and a plurality of read/write heads positioned on upper and lower surfaces of the discs. The head actuator includes a plurality of load springs. Each load spring has a plurality of through holes located at its inner end. A head is mounted to the outer end of each load spring for positioning the head on the upper or lower surface of a disc. The head actuator further includes an integrally formed head arm assembly. The head arm assembly has a plurality of parallel head arms integrally formed at their inner ends to a main head arm body member and extended in parallel therefrom such that they can be positioned between corresponding discs of the disc drive and storage system. Each head arm is formed with a plurality of through holes in its outer end for alignment with a plurality of corresponding through holes formed in each head load spring at its inner end. The load springs are connected to opposite sides of the head arms using the aligned through holes of the load springs and head arms. The head load springs are sequentially connected to the head arms in an assembly method using a plurality of screws for directly connecting the outer ends of the head arms to the inner ends of the load springs via two series of through holes of the head arms and the load springs.

15 Claims, 5 Drawing Sheets

HEAD ACTUATOR HAVING A PLURALITY OF HEAD ARMS AND LOAD SPRINGS FOR DISC DRIVE AND STORAGE SYSTEM, AND RELATED METHOD ASSEMBLY

BACKGROUND OF THE INVENTION

This invention relates to a head actuator for a disc drive and storage system used for supporting a plurality of read/write heads over the surfaces of a plurality of discs. More particularly, this invention relates to a head actuator for a Winchester type of hard disc drive and storage system.

In recent years, there has been a demand for higher storage capacity in disc drive and storage systems. Two methods of achieving a higher capacity are: (1) improving the recording density of the disc and (2) increasing the number of discs. When the number of discs are increased, the number of read/write heads also increase in relationship to the number of discs. Such heads are normally provided in an assembly comprising head arms and load springs corresponding to the heads being used (hereafter referred to as a "head actuator"). Such head arm/spring assemblies are conventionally made by stacking or positioning in parallel series the head arms of the same shape as will be described below by reference to prior art FIGS. 1 and 2.

Figure 1:
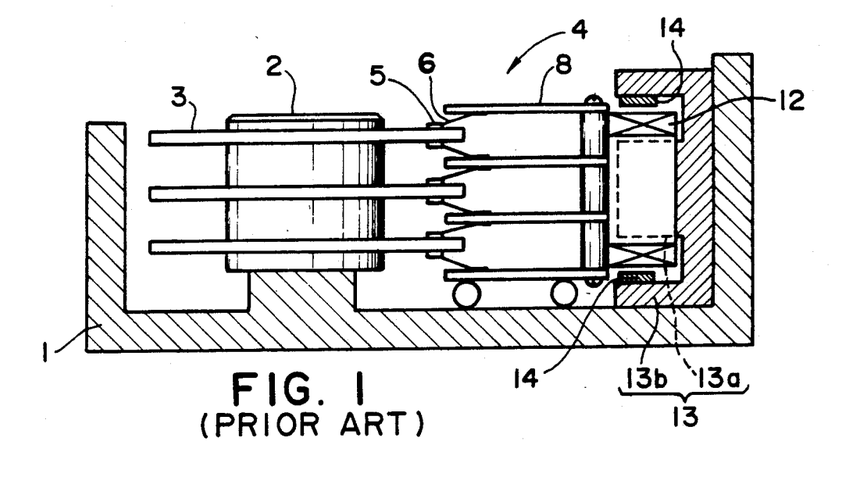
FIG. 1 is a cross-sectional view of a primary part of a prior art disc drive and storage system.
Figure 2:
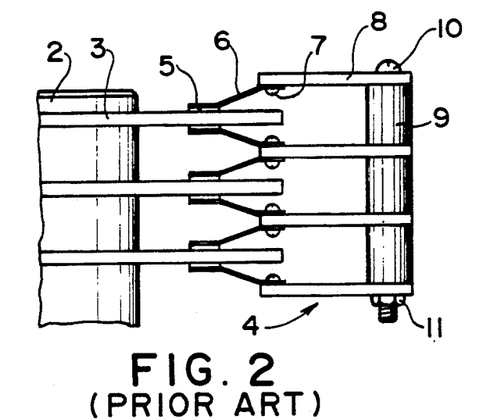
FIG. 2 is a cross-sectional view of a primary part of a head actuator for the prior art disc drive and storage system shown in FIG. 1.

FIG. 1 is a schematic cross-sectional view of a primary part of a conventional disc drive and storage system. FIG. 2 is a schematic cross-sectional view of a primary part of a head actuator for the prior art disc drive and storage system shown in FIG. 1. As shown in these figures, a base 1 is provided having a spindle 2 thereon for rotatably mounting a plurality of magnetic storage discs 3. A spindle motor (not shown) is normally located inside of the spindle 2 for rotatably driving the spindle. The plurality of magnetic storage discs 3 are located on the spindle 2 and are spaced apart from one another in parallel series. The discs 3 are rotated at a constant high speed (for example, 3600 rpm) by the driving force of the spindle motor. A head actuator 4 is located adjacent the discs 3 to move data write/read heads 5 to target tracks on the discs 3. The plurality of heads 5 are attached to respective outer ends of load springs 6 through zimbal springs. The other inner ends of the load springs 6 are connected to respective outer ends of a plurality of corresponding head arms 8 using a series of screws 7. The head arms 8 are aligned in parallel series and stacked through a plurality of separate spacers 9 and are integrated or assembled together using a screw 10 and a nut 11. As shown, the heads 5, the load springs 6, the head arms 8 and the spacers 9 are formed in the same shape for the respective components. The assembled head arms 8 are provided with a fixed driving coil 12. A yoke 13 is provided on the base 1 and comprises an inner yoke 13a and an outer yoke 13b. Magnets 14 are located on the internal wall surfaces of outer yoke 13b and are magnetized in the vertical direction as seen in FIG. 1. The driving coil 12 is located in the magnetic gap between the magnets 14 and inner yoke 13a.

Figure 3:
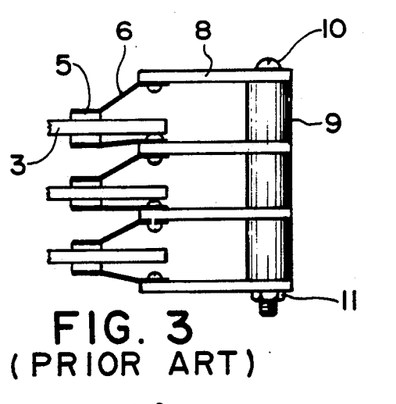
FIG. 3 is a cross-sectional view of the primary part of the head actuator of FIG. 2, showing the positioning of the heads to the discs when head arms having a positive out-of-tolerance in the thickness dimension are assembled together.
Figure 4:
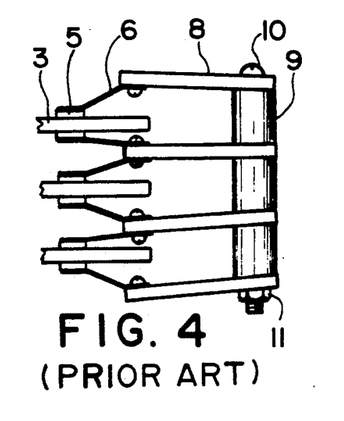
FIG. 4 is a cross-sectional view of the primary part of the head actuator of FIG. 2, showing the positioning of the heads to the discs when spacers having end surfaces inclined and out-of-tolerance are assembled together.

In this type of head actuator structure, each of the head arms 8 are separately formed in the same shape and each of the spacers 9 are separately formed in the same shape. Accordingly, large numbers of each components are generally produced in unit lots during manufacturing. Thus, for a particular lot, the shape and size of a component can often deviate in a single dimension from the pre-determined dimension allowance. For example, FIG. 3 depicts the primary part of the head actuator of the FIG. 1 prior art, and what the positioning of the head arms could be to the discs after assembly when the thickness dimension of the head arms 8 deviates and exceeds the pre-determined tolerance allowance. FIG. 4 depicts the primary part of the head actuator of the FIG. 1 prior art, and what the positioning of the head arms could be to the discs after assembly when the spacers 9 have one of the end surfaces inclined out of the normal tolerance allowance. In FIG. 3, the pitch between head arms 8 becomes larger than that between the discs 3. Therefore, an adverse effect can be created on the flying characteristics and data write/read characteristics of heads 5. In FIG. 4, the heads 5 are no longer parallel to the discs 3. Again, an adverse effect can be created on the head flying characteristics.

With a demand to improve storage capacity, the number of discs increases and the out-of-tolerance conditions can become further magnified under conditions as described above. When dimension tolerances are tightened to solve these problems, manufacturing costs increase. Moreover, the additional stacking of a plurality of the head arms 8 creates increased assembling labor time and costs because more heads 5 have to be accurately located at the pre-determined outer radius surface positions on the discs 3. Also, problems arise where an axial or tightening force of the screw 10 is weakened due to temperature changes in the disc drive and storage system, deviation in stacking or alignment of the head arms 8 is generated, and thereby data write/read operations become more difficult.

Recently, there has been developed a type of head actuator for a disc drive and storage system which has integral head arms in an effort to solve some of the above problems. Examples are shown in U.S. Pat. No. 4,796,122, U.S. Pat. No. 4,829,395 and Japanese Unexamined Patent Publication (Kokai) No. 63-188878. This type of head actuator has an integral head arm body with a plurality of integral head arms. The integral head arms extend outwardly from the body to support load springs. The load springs are assembled after the integral arms and arm body are formed.

In the above type of integral head actuator, the load springs must again be connected to the outer ends of the integral head arms. The load spring connecting technique requires a special tool, or a special material, such as a connecting block, and several screws for connecting the load springs to this type of integral head arm body. For example, in this type of head actuator using a connecting block, an intermediate material is located between the head arms and the load springs with connection then by several screws. The purpose of using the intermediate material is to change the force direction of the screws from a perpendicular direction to a direction parallel to the axis of the head arms. In this connecting technique, the load springs for the upper and lower sides of a disc are first connected to the intermediate material by screws from a perpendicular direction compared to the axis of the head arms. Then, each intermediate material fitted with the load spring must be connected to the outer end of each head arm by screws from a direction parallel to the axis of the head arms.

In the alternative embodiment of this type of head actuator, the load springs are directly connected to the head arms by screws at the outer ends of the head arms. However, in this embodiment standard type load springs, such as a flat type load spring shown in U.S. Pat. No. 4,796,122, cannot be used. The end portion of the load spring must be customized to an L-shape bracket for connecting it to the head arms by screws at the outer end of the head arm.

SUMMARY OF THE INVENTION

Accordingly, it is a primary object of the present invention to provide an improved head actuator for achieving greater accuracy and consistency in the positioning of a plurality of heads to discs in a disc drive and storage system.

Another object of the present invention is to provide a head actuator for a disc drive and storage system for ensuring good flying performance, flying attitude and data write/read characteristics.

It is another object of the present invention to provide a head actuator for a disc drive and storage system for reducing manufacturing costs and assembling time and procedures, while maintaining good write/read characteristics even during temperature changes in the system.

Additional objects and advantages of the invention will be set forth in part in the description which follows, and, in part, will be obvious from the description, or may be learned by practice of the invention. The objects and advantages of the invention may be realized and obtained by means of the instrumentalities and combination particularly pointed out in the appended claims.

To achieve the foregoing objects and in accordance with the purpose of the invention, as embodied and broadly described herein, there is provided a head actuator for a disc drive and storage system having a plurality of discs and a plurality of heads for reading or writing information on the discs, the head actuator comprising: (a) a plurality of load springs, each load spring having a plurality of through holes at the inner end and each load spring having an outer end for loading a head on a disc; (b) an integral head arm assembly having a main head arm body member and a plurality of parallel head arms integrally formed at inner ends to the main body member and extending outwardly spaced apart from one another so that at least one head arm can be located between a respective pair of the discs, each head arm having a plurality of through holes at the outer end corresponding to and for alignment with a plurality of through holes of a load spring; and (c) a plurality of fastening members for directly connecting the outer ends of the head arms to the inner ends of the load springs using the corresponding through holes of the head arms and the load springs, wherein load springs are positionable on both sides of a head arm and heads on the outer ends of load springs are positionable on both sides of a disc.

In a preferred embodiment, corresponding through holes of the head arms are formed along common axis perpendicular to the lengths of the head arms and a through hole of each load spring has a corresponding through hole of each head arm. More particularly, the head arms have a first series of through holes aligned with a first series of corresponding through holes of the load springs for connecting a first series of load springs to the same sides of the head arms and for positioning heads of the first series of load springs to the upper surfaces of the discs, and wherein the head arms have a second series of through holes aligned with a second series of corresponding through holes of the load springs for connecting a second series of load springs to the other same sides of the head arms and for positioning heads of the second series of load springs to the lower surfaces of the discs.

Preferable, the first series of through holes comprise two through holes on each head arm and the second series of through holes comprise two through holes on each head arm, the through holes of the first series and the through holes of the second series holes are formed at opposite sides in the width direction of the head arm, such that the two through holes of the first series are diagonal to each other and the two through holes of the second series are diagonal to each other.

In accordance with the invention, there is further provided a special method for assembling the head actuator described above.

BRIEF DESCRIPTION OF THE DRAWINGS

The accompanying drawings, which are incorporated in and constitute a part of the specification, illustrate embodiments of the invention and, together with the description, service to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

Figure 5:
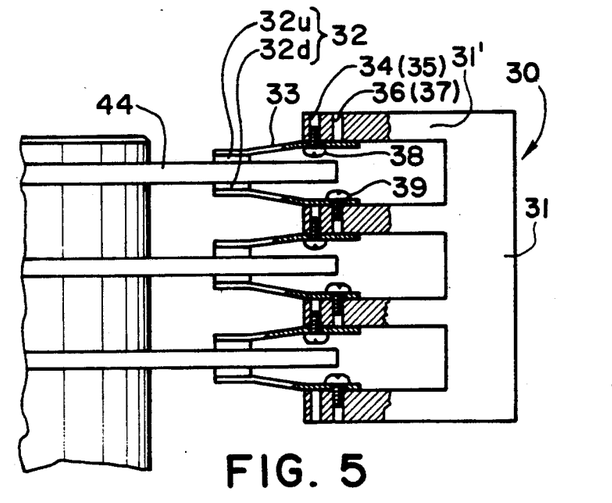
FIG. 5 is a cross-sectional view of a primary part of a head actuator for a disc drive and storage system in accordance with the present invention.
Figure 7:
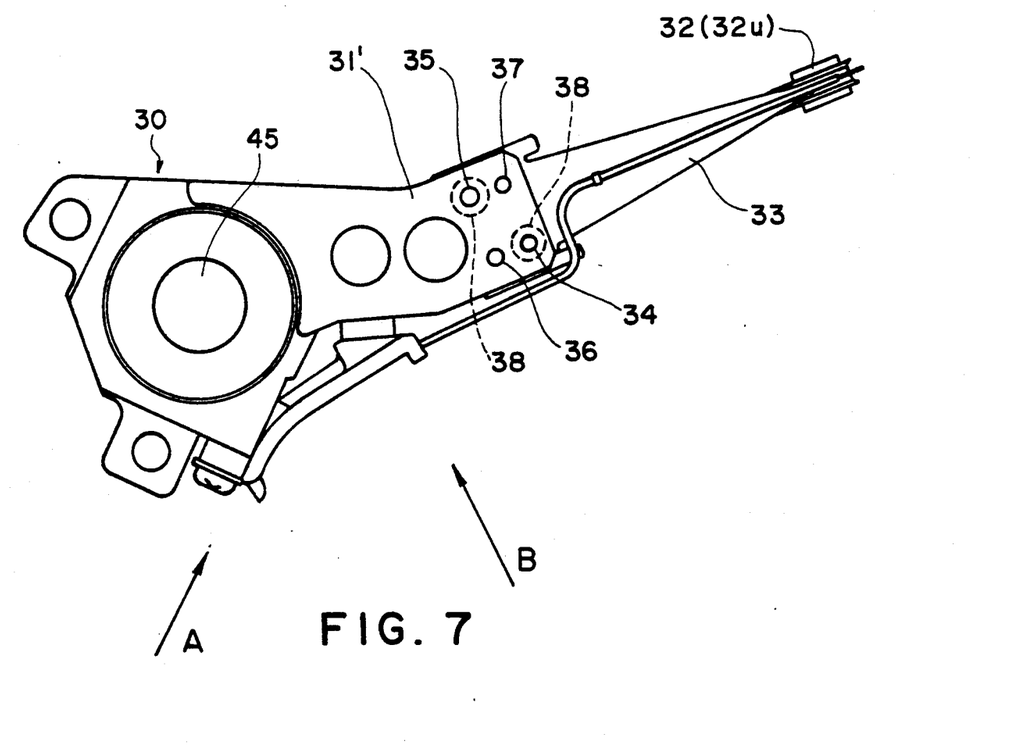
FIG. 7 is a plan view illustrating an embodiment of a head actuator for a disc drive and storage system in accordance with the present invention.

FIG. 5 is a cross-sectional view of a primary part of a head actuator for a disc drive and storage system in accordance with the present invention. A plurality of magnetic storage discs 44 are mounted on the same axis on a spindle and are spaced apart from one another. The discs 44 rotate at a constant high speed of, for example, 3600 rpm. A plurality of heads 32 are provided for reading or writing information on both sides of the discs 44. Reference numeral 32u refers to a head positioned on the upper surface of a disc, while reference numeral 32d refers to a head positioned on the lower surface of a disc. An integral head arm assembly 30 is provided comprising a main head arm body member 31 and head arms 31' formed at one side. The head arms 31' and body member 30 are integrally formed to create a single one-piece assembly 30, such as by using known molding techniques. The head arms 31' are uniformly spaced apart so that one arm can be located between a pair of discs 44 as shown in FIG. 5. Each head arm 31' is formed with a plurality of through holes 34 (35), and 36 (37) at its outer end for use in connecting load springs 33 to both the upper and bottom surfaces of the head arm as shown in FIGS. 5 and 7. Preferably, each head arm 31' is formed with four through holes located in an arrangement as shown in FIG. 7. Moreover, the through holes 34 (35), and 36 (37) of head arm 31' are formed so as to be aligned on the same axis or line perpendicular to the longitudinal axis of each of the other head arms 31'. All of the through holes 34 (35), and 36 (37) have threaded inner surfaces for receiving screws.

As also best seen from FIG. 5, the head actuator in accordance with the present invention further comprises a plurality of head load springs 33 which are connectable at their inner ends to corresponding outer ends of the head arms 31'. Each of the head load springs 33 has a head 32 connected at its outer end, with the head positioned on either the bottom or upper side of a disc 44. Each of the load springs 33 has a series of four through holes at its inner end corresponding in position and alignment to the four through holes 34, 35, and 36, 37 of the head arms 31'. For reasons as will be described in greater detail below, the head load springs 33 have their through holes formed so they are in alignment with the corresponding through holes of the head arms 31'. More particularly and as embodied herein, a first series of through holes 34 (35) on 31' are used, in alignment with a first series of corresponding through holes on a load spring 33, for connecting that load spring 33 to the lower surface of the arm 31' and positioning the load spring 33 with head 32u on the upper surface of a disc 44. A second series of through holes 36 (37) on head arm 31' are used, in alignment with a second series of corresponding through holes on a load spring 33, for connecting that load spring 33 to the upper surface of the arm 31' and positioning the load spring 33 with head 32d on the lower surface of a disc 44 as shown in FIG. 5. Screws 38 are inserted into the first through holes of the load spring 33 and the first through holes 34 and 35 of the head arm 31' to connect head load spring 33 to the lower surface of the head arm 31' so that the head 32u attached to that head load spring 31' is positioned at the upper surface of the disc 44. A pair of screws 39 are inserted into the corresponding second through holes of a load spring 33 and the second through holes 36 and 37 of one of the head arms 31' to connect head load spring 33 to the top surface of the head arm 31' so that the head 32d of the head load spring 33 is positioned at the lower surface of a disc 44. The above arrangement is best seen with reference to FIGS. 5 and 7.

Figure 6A:
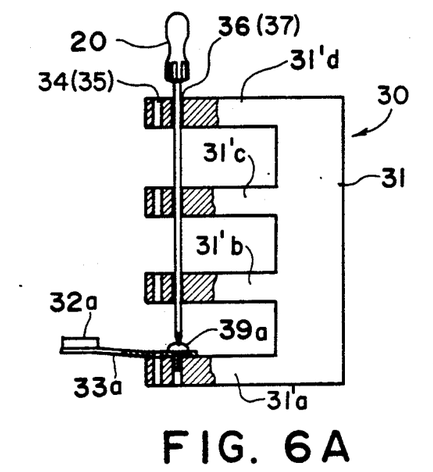
FIG. 6A is a cross-sectional view of a primary part of a head actuator, showing a first step in a method for connecting a head load spring to a head arm in accordance with the present invention.

The method of assembling the various components of the head actuator in accordance with the present invention will now be described with reference to the method steps depicted in FIGS. 6A through 6F. As shown in FIG. 6A, first there is provided the integrally formed head arm assembly 30 having head arm body 31 and a plurality of arms 31'. A head load spring 33a for positioning against the lower surface of a disc 44 is to be connected at the lowest position of the assembly 30. Using a fastening device such as a screw driver 20 having a extended length, driver 20 is inserted through the entire second series of through holes 36 and 37, through the second series of through holes in the lowest head load spring 33a and then applying and securing screws 39 into the second series of through holes 36 and 37 formed in the head arm 31'a located at the lowest portion of the body member 31. Head 32a, connected to load spring 32a, will be positioned on the lower surface of a disc 44.

Figure 6B:
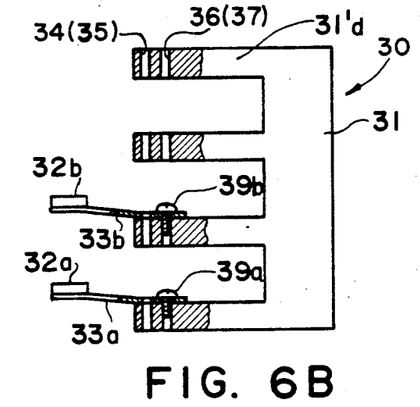
FIG. 6B is a cross-sectional view of a primary part of a head actuator, showing a second step in a method for connecting a head load spring to a head arm in accordance with the present invention.

As shown in FIG. 6B, the second step of the assembly method is to connect a second head load spring 33b to the top surface of the head arm 31'b by inserting screws 39 into the second series of through holes of the head load spring 33b and the through holes 36 and 37 of the head arm 31'b. Head 32b, connected to head load spring 33b, will be positioned on the lower surface of another disc 44. The connection of the head load spring 33b to the head arm 31'b using the screws 39 are again achieved using the screw driver 20.

Figure 6C:
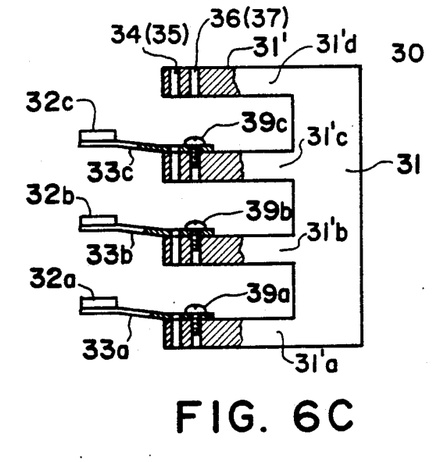
FIG. 6C is a cross-sectional view of a primary part of a head actuator, showing a third step in a method for connecting a head load spring to a head arm in accordance with the present invention.

As shown in FIG. 6C, the third step of the assembly method in accordance with the invention is to connect a third head load spring 33c to a third head arm 31'c in sequence, again using screws 39 into the second series of holes of the head load spring 32c and the through holes 36 and 37 of the head arm 31'c. This will provide for the head 32c located on head arm 33c to be positioned on the lower surface of another disc 44.

Figure 6D:
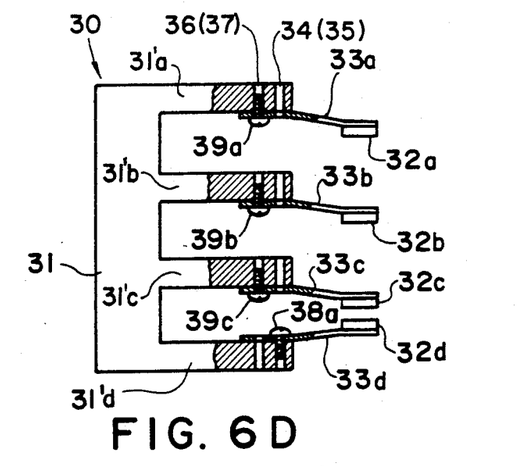
FIG. 6D is a cross-sectional view of a primary part of a head actuator, showing a fourth step in a method for connecting a head load spring to a head arm in accordance with the present invention.

As now shown with reference to FIG. 6D, the head arm assembly 30 is inverted such that the head arms 33a, 33b, and 33c are located as shown at the top in FIG. 6D. Using a similar technique of connecting head load springs to head arms as for the first series of method steps of FIG. 6A, 6B and 6C, the fourth step of the assembly method is to connect a head load spring 33d to the lower most head arm 31'd (after inversion of the head assembly 30). Head load spring 33d is connected to the lower head arm 31'd by using the first series of through holes 34 and 35 of head arm 31'd and the first series of through holes of the head load spring 33. Specifically, screws 38 are inserted into the first series of through holes of load spring 33d and arm 31'd using the screw driver 20 inserted from the top of the head body assembly 30, analogous to that described for and shown in FIG. 6A. The head 32d at the end of head load spring 33d will be positioned on the upper surface of a disc 44 after completion of the assembly method.

Figure 6E:
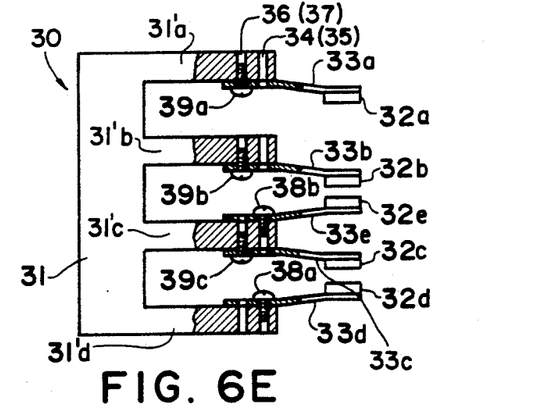
FIG. 6E is a cross-sectional view of a primary part of a head actuator, showing a fifth step in a method for connecting a head load spring to a head arm in accordance with the present invention.

As shown in FIG. 6E, the fifth step of the method assembly is to connect a head load spring 30e to the upper side of the head arm 31'c using the first series of through holes of the load spring 33e and the first series of through holes 34 and 35 of the head arm 31'c. The head 32e, connected to the load spring 33e, will be positioned on the upper surface of a disc 44 after completion of the assembly method.

Figure 6F:
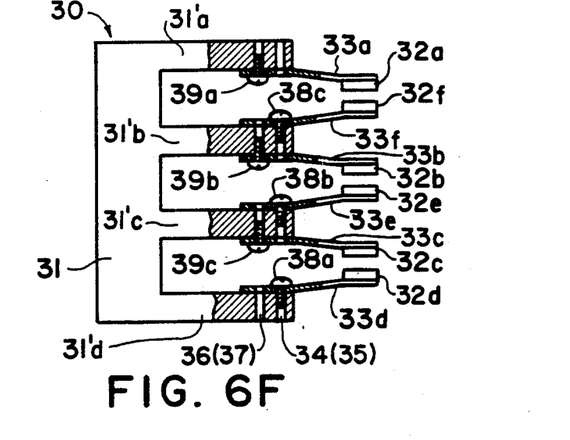
FIG. 6F is a cross-sectional view of a primary part of a head actuator, showing a sixth step in a method for connecting a head load spring to a head arm in accordance with the present invention.

As shown in FIG. 6F, the sixth step of the assembly method is to connect in sequence a head load spring 33f to the top surface of the head arm 31'b using the first series of through holes of the head load spring 33f and the first series of through holes 34 and 35 of the head arm 31'b. Screws 38 connect the load spring 33f to the head arm 31'b in a manner analogous to that shown in FIGS. 6D and 6E, i.e., using the screw driver 20 inserted from the top of the head assembly 30.

With completion of the six method steps as described above and shown in FIGS. 6A through 6F, the various components of the head actuator have been quickly and easily assembled in accordance with the invention for use in a disc drive and storage system as previously illustrated in FIG. 5.

Figure 8:
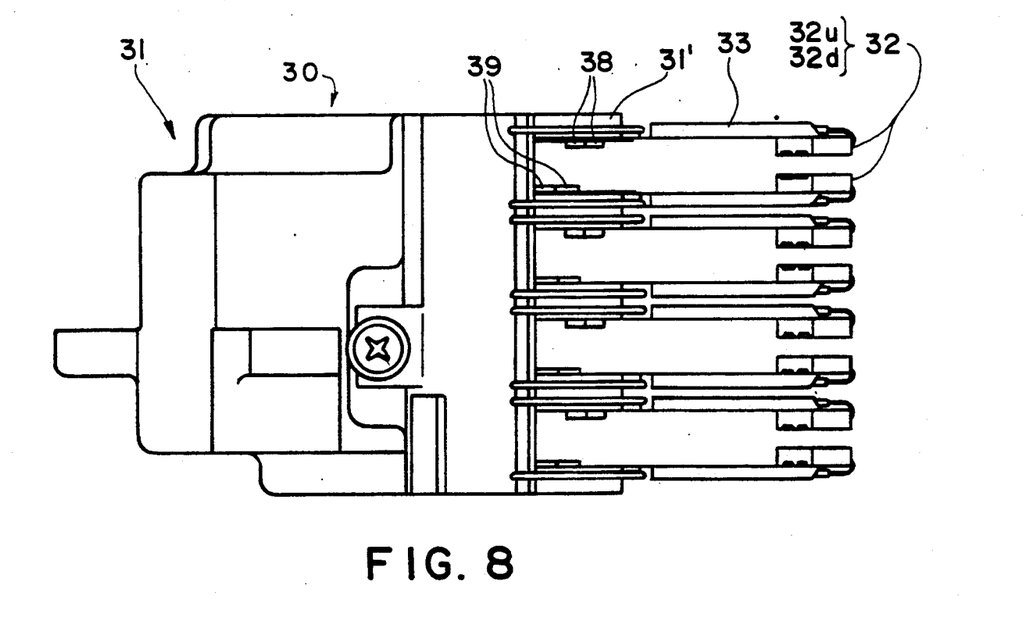
FIG. 8 is a side view of the head actuator of FIG. 7, taken from the arrow mark direction "A" in FIG. 7.
Figure 9:
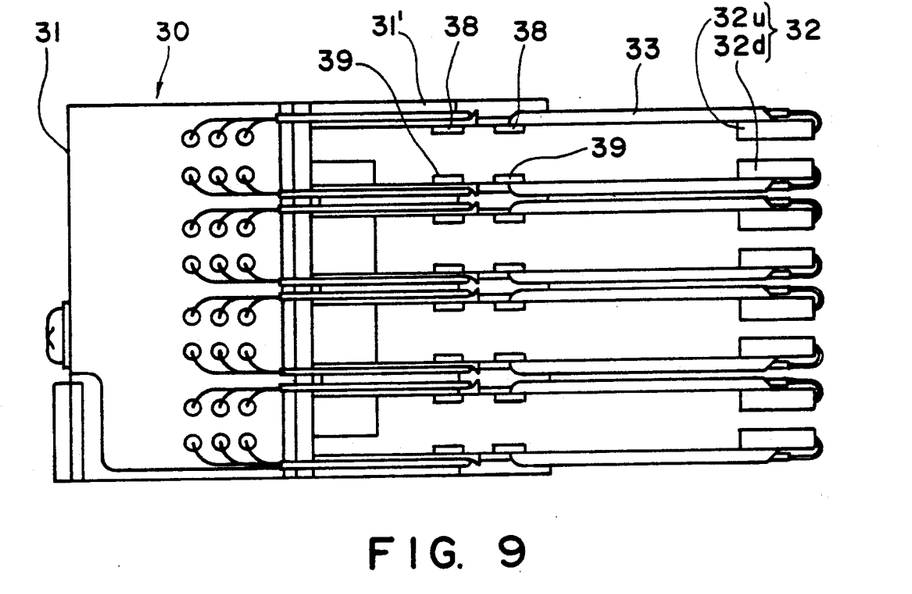
FIG. 9 is a side view of the head actuator of FIG. 7, taken from the arrow mark direction "B" of FIG. 7.
Figure 10:
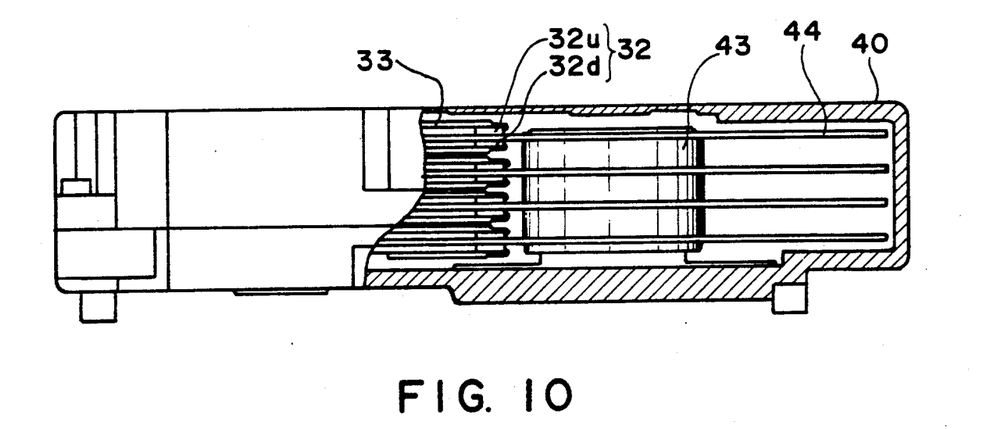
FIG. 10 is a partial cut-away, cross-sectional view illustrating an embodiment of a disc drive and storage system incorporating the head actuator shown in FIG. 7.
Figure 11:
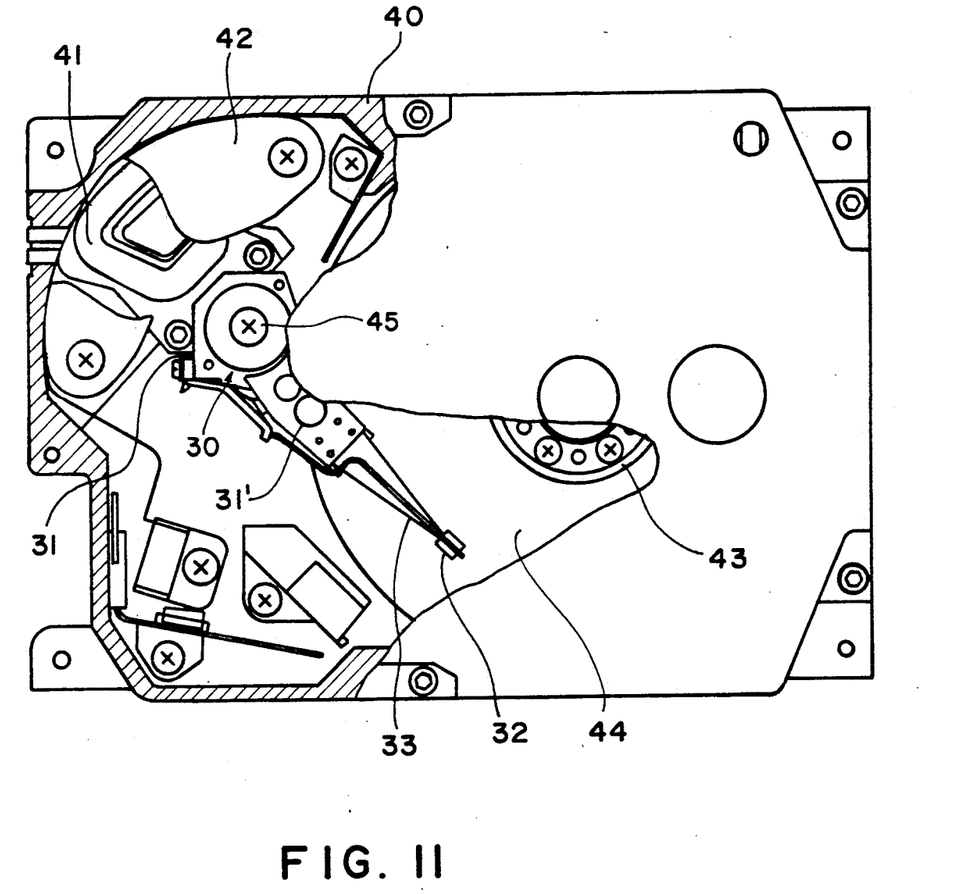
FIG. 11 is a partial cut-away, top plan view illustrating an embodiment of a disk drive and storage system incorporating the head actuator shown in FIG. 7.

FIG. 7 is a top plan view illustrating an embodiment of a head actuator of the present invention. FIG. 8 is a side view of the head actuator of FIG. 7 taken from the arrow mark direction "A" in FIG. 7. FIG. 9 is a side view of the head actuator taken from the arrow mark direction "B" in FIG. 7. FIG. 10 is a partial, cut-away cross-sectional view illustrating an embodiment of a disc drive and storage system incorporating the head actuator shown in FIG. 7. FIG. 11 is a partial cut-away, top plan view illustrating an embodiment of a disc drive and storage system incorporating the head actuator shown in FIG. 7. The head arm assembly 30 is formed with integral base member 31 and the plurality of head arms 31' spaced apart from one another. The head arm assembly 30, with head arms 31' at their inner ends connected to the body member 31, can be integrally formed such as by conventional molding techniques. The outer ends of the head arms 31' can be molded with the first and second series of through holes 34 and 35, and 36 and 37, or the through holes can be drilled in a subsequent manufacturing process as conventionally known. The head arms 31' can be accurately aligned in parallel to each other by using molding techniques. Similarly, the series of through holes in the head arms 31' can be accurately aligned using molding techniques or a subsequent drilling process.

It can also be seen that flat head load springs can be used in the assembly for the head actuator of the present invention without having to customize the head load springs in an unusual configuration, thus reducing manufacturing costs for the head load spring component. The head load spring 33 can be stamped as conventionally known. Moreover, the corresponding through holes of the load springs can be formed during the stamping procedure by a concurrent cutting step or by a subsequent manufacturing drilling step as is also conventionally known. The head 32 can be connected or loaded to the load spring 33 through a zimbal spring. The load spring 33 are then easily attached to the head arms 31' by the assembly method as described earlier with reference to FIG. 6A through 6F. The head arm assembly 30 is rotatably mounted in a disc enclosure 40 for pivotal movement around axis 45. This allows for movement of any of the plurality heads 32 along the discs 44 to specified tracks on the discs.

As shown in FIG. 11, a coil 41 is provided at the left rear side of head arm assembly 30. The coil 41 is associated with the head arm assembly 30 and, in conjunction with fixed permanent magnets and a variable direct current applied to the coil 41, coil 41 permits rotational positioning of head arm assembly 30 to be controlled by means of a feed back circuit control loop. The coil 41 is located between the magnetic gaps of magnets 42 provided in the disc enclosure 40. Accordingly, a moving coil-type force motor can be established. A spindle 43 is located as shown in FIG. 10 with a plurality of the discs 44 mounted and aligned in a series on this spindle 43. A spindle motor (not shown) for rotating the discs 44 mounted on spindle 43 is operatively connected to spindle 43, preferably inside of the spindle itself.

According to the invention and as been shown by the structure described above, the head arm assembly 30 is integrally formed with the plurality head arms 31' to a base member 31. Therefore, the size or dimension accuracy of the head arms can be improved, thereby also improving head flying characteristics, flying attitude and data write/read characteristics. Furthermore, integral formation of the head assembly achieves a reduction in manufacturing costs and assembling procedures for the head arms, while at the same time eliminating problems in stacking deviation of the head arms during temperature changes in the disc drive and storage system.

Furthermore, in accordance with the invention, the additional components for the head actuator can be easily assembled to the integral head arm assembly as shown by the sequence of method assembly steps described above and depicted in FIGS. 6A through 6F. Using the assembly method in accordance with the invention, the head load springs can be formed in a flat type shape using conventional stamping techniques. The heads 32u for the upper surfaces of the discs 44 are attached to the head arms 31' through the load springs 33 using the screws 38 engaged in the first series of through holes 34 and 35 of load springs 33. The heads 32d for the lower surfaces of the discs 44 are attached to the head arms 31' through the load springs 33 using the screws 39 engaged in the second series of through holes 36 and 37. The series of heads 32d for the lower surfaces of the discs can be sequentially attached to the head arms from the lower head arm 31'a to the upper head are 31'c by inserting a screw driver 20 with an extended length into the through holes 36 and 37. Thereafter, the head arm assembly 30 can be inverted, and the series of heads 32u for the upper surfaces of the discs can be attached sequentially to the head arms from the lower head arm 31'd to the upper head arm 31'b by again inserting the screw driver 20 with the extended length into holes 34 and 35. With such an assembly method, the heads 32 can be attached to the head arms 31' effectively, quickly, and easily. This achieves further reduction in manufacturing time and costs. The assembly sequence of the heads 32 of the load springs 33 to the integral head arm assembly 30 not only achieves a simpler assembly method, thus reducing manufacturing time and costs, but also provides for an improved read/write operation for such a head actuator in the disc drive and storage system.

Thus, it is intended that the present invention cover the modifications and variations in the head actuator for a disc drive and storage system in accordance with the invention with the scope of the appended claims and their equivalents, and without limitation to the different environments in which to use the head actuator.

What is claimed is:

1. A head actuator for a disc drive and storage system having a plurality of discs, each disc with an upper surface and a lower surface, and a plurality of heads for reading or writing information on the disc, the head actuator comprising:
   (a) a plurality of load springs, each load spring having at least four through holes at a first end of the load spring, at least two of said holes generally aligned along a longitudinal axis of the load spring, and a head mounted at a second end of the load spring for positioning the head on a surface of the disc;
   (b) an integral head arm assembly having a main head arm body member and a plurality of parallel head arms having first ends integrally formed to the body member and second ends extending outwardly from the body member and spaced apart from one another so that at least one head arm can be located between a respective pair of the discs, each head arm having at least four through holes at the second end of the head arm corresponding to and for alignment with the at least four through holes of a load spring; and
   (c) a plurality of fastening members for directly connecting the second ends of the head arms to the first ends of the load springs using the corresponding four through holes of the head arms and the load springs, wherein the load springs for the upper surfaces of the discs are connected to a first side of the second ends of the head arms by at least two aligned through holes of the load springs and head arms located diagonal to each other relative to said longitudinal axis and the load springs for the lower surfaces of the discs are connected to a second side of the second ends of the head arms opposite to the first side by the remaining at least two aligned through holes of the load springs and head arms located diagonal to each other relative to said longitudinal axis such that the load springs are positionable on opposite first and second sides of a head arm and heads on the second ends of the load springs are positionable on opposite sides of the corresponding discs.

2. The head actuator of claim 1, wherein the corresponding through holes of the head arms are formed along common axis perpendicular to and width dimensions of the head arms.

3. The head actuator of claim 1, wherein a through hole of each load spring has a corresponding through hole of each head arm.

4. The head actuator of claim 1, wherein the fastening members are a plurality of screws and wherein the through holes of each head arm have threaded inner surfaces for receiving the screws.

5. A head actuator for a disc drive storage system having a plurality of discs, each disc with an upper surface and a lower surface, and a plurality of heads for reading or writing information on the discs, the head actuator comprising:
   (a) a plurality of load springs each load spring having a longitudinal axis and, each load spring having a first series of at least two through holes being located diagonal to each other relative to said longitudinal axis and a second series of at least two through holes being located diagonal to each other relative to said longitudinal axis at first end of the load spring and wherein at least one hole of the first series and at least one hole of the second series are generally aligned along a longitudinal axis of the load spring and a head mounted at a second end of the load spring for positioning the head on a surface of the disc;
   (b) a head arm assembly having a main head arm body member and a plurality of parallel head arms having ends connected to the body member and second ends extending outwardly from the body member and spaced apart from one another so that at least one head arm can be located between a respective pair of the discs, each head arm having a first series of at least two through holes being located diagonal to each other relative to said longitudinal axis and a second series of at least two through holes being located diagonal to each other relative to said longitudinal axis at the second end corresponding to and for alignment with respectively the first series of through holes and the second series of through holes of a load spring; and
   (c) a plurality of fastening members for directly connecting the second ends of the head arms to the first ends of the load springs using the corresponding first and second series of the through holes of the head arms and the load springs, wherein the first series of through holes of the head arms in alignment with the first series of through holes of the load springs are used to connect in sequence a first series of load springs on first sides of the second ends of the head arms for positioning the heads of the first series of load springs on the upper surfaces of the discs, and the second series of through holes of the head arms in alignment with the first series of through holes of the load springs are used for connecting in sequence a second series of load springs to second sides opposite the first sides of the second ends of the head arms for positioning heads of the second series of load springs on the lower surfaces of the discs.

6. The head actuator of claim 5, wherein the corresponding first and second series of through holes of the head arms are formed along common axis perpendicular to length and width dimensions of the head arms.

7. The head actuator of claim 6, wherein a through hole of each load spring has a corresponding through hole of each head arm.

8. The head actuator of claim 5, wherein the plurality of fastening members comprise screws and the through holes of each head arm have threaded inner surfaces for receiving screws.

9. The head actuator of claim 5, wherein the head arm assembly comprises an integral head arm assembly formed of a one-piece material.

10. A method for assembling a plurality of load springs to a plurality of parallel head arms which are spaced apart from one another so that at least one head arm can be located between a respective pair of the discs in a head actuator for a disc drive and storage system, the method comprising:
   (a) forming a first series of at least two through holes being located diagonal to each other relative to longitudinal axes of said head arms and a second series of at least two through holes being located diagonal to each other relative to said longitudinal axis in first ends of the plurality of parallel head arms and generally aligned wherein at least one hole of each of said first series and at least one hole of each of said second series are along a longitudinal axis of the load springs such that the corresponding through holes are aligned along common axes perpendicular to length and width dimensions of the head arms;

(b) forming a first series of at least two through holes and a second series of at least two through holes in first ends of the plurality of load springs such that the first series of through holes of the load springs correspond to the first series of through holes of the head arms and the second series of through holes of the load springs correspond to the second series of through holes of the head arms;

(c) connecting a first series of load springs to corresponding first sides of the first ends of the head arms using fasteners insertable into the first series of through holes of the load springs and head arms such that the first series of load springs are sequentially connected to the head arms at the corresponding first sides of the first ends of the head arms by inserting a fastener tool through the aligned first series of through holes of the load springs and head arms; and (d) connecting a second series of load springs to corresponding second sides opposite the first sides of the first ends of the head arms using fasteners insertable into the second series of through holes of the load springs and head arms such that the second series of load springs are sequentially connected to the head arms at the corresponding second sides of the first ends of the head arms by inserting a faster tool through the aligned second series of through holes of the load spring and head arms.

11. The method of claim 10, wherein the forming step (a) further includes forming the through holes with thread inner surfaces for receiving screws.

12. The method of claim 11, wherein in the connecting step (c) the fasteners comprise screws.

13. The method of claim 11, wherein in the connecting step (c) the fastener tool has a length for extending from one side of the plurality of head arms through the plurality of the through holes to the other side of the plurality of head arms so as to connect a load spring to the lowest head arm and sequentially thereafter connecting a load spring to the next adjacent head arm.

14. The method of claim 10, further comprising the step, prior to step (a), of forming an integral head arm assembly of a main arm body and a plurality of head arms extending outwardly spaced apart from one another so that at least one head arm can be located between a pair of the discs.

15. The method of claim 14, wherein the step of forming the integral head arm assembly comprises molding the main arm body and the plurality of head arms as onepiece.

* * * * *

UNITED STATES PATENT AND TRADEMARK OFFICE
CERTIFICATE OF CORRECTION

PATENT NO. : 5,099,373
DATED : March 24, 1992
INVENTOR(S) : Shibata et al.

It is certified that error appears in the above-identified patent and that said Letters Patent is hereby corrected as shown below:

Col. 1, line 65, "components" should be --component--.

Col. 5, line 61, after "on" insert --head arm--.

Col. 8, line 52, "are" should be --arm--.

Col. 9, line 4, "with" should be --within--.

Col. 9, line 11 (claim 1), "disc" should be --discs--.

Col. 9, line 52 (claim 2), after "to" insert --length--.

Col. 10, line 13 (claim 5), after "ing" insert --first--.

Col. 11, line 2 (claim 10), "axis" should be --axes--.

Col. 11, line 3 (claim 10), delete "and generally aligned".

Col. 11, line 5, (claim 10), after "are" insert --generally aligned--.

*Col. 12, line 5 (claim 10), "faster" should be --fastener--.

UNITED STATES PATENT AND TRADEMARK OFFICE
CERTIFICATE OF CORRECTION

PATENT NO. : 5,099,373
DATED : March 24, 1992
INVENTOR(S) : Shibata, et. al.

It is certified that error appears in the above-indentified patent and that said Letters Patent is hereby corrected as shown below:

Col. 12, line (claim 10), "faster" should be --fastener--.

Signed and Sealed this

Fifteenth Day of March, 1994

*Attest:*

BRUCE LEHMAN

*Attesting Officer*     *Commissioner of Patents and Trademarks*